US008728597B2

(12) United States Patent
Beele

(10) Patent No.: US 8,728,597 B2
(45) Date of Patent: *May 20, 2014

(54) SYSTEM AND METHOD FOR SEALING AN OPENING IN A WALL IN WHICH AT LEAST ONE TRANSPORT DEVICE SUCH AS A CABLE, CONDUIT OR TUBE HAS BEEN FED THROUGH

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 1746 days.

This patent is subject to a terminal disclaimer.

(21) Appl. No.: 10/589,445

(22) PCT Filed: Feb. 10, 2005

(86) PCT No.: PCT/NL2005/000099
§ 371 (c)(1),
(2), (4) Date: Aug. 11, 2006

(87) PCT Pub. No.: WO2005/078884
PCT Pub. Date: Aug. 25, 2005

(65) Prior Publication Data
US 2007/0169963 A1    Jul. 26, 2007

(30) Foreign Application Priority Data
Feb. 13, 2004    (NL) .................................. 1025485

(51) Int. Cl.
*H02G 3/18*    (2006.01)
(52) U.S. Cl.
USPC ..................... 428/36.5; 428/34.1; 428/35.7
(58) Field of Classification Search
USPC ....................... 428/36.5, 35.7, 34.1
See application file for complete search history.

(56) References Cited

U.S. PATENT DOCUMENTS 3,513,114 A    5/1970    Vandersall et al.
3,574,644 A    4/1971    Olstowski et al.
(Continued)

FOREIGN PATENT DOCUMENTS

DE    2162251 A1    12/1971
DE    3446503        8/1985
(Continued)

OTHER PUBLICATIONS

PCT International Search Report from International Application No. PCT/NL2004/000280 dated Sep. 8, 2004.

(Continued)

*Primary Examiner* — Brent O'Hern
(74) *Attorney, Agent, or Firm* — Wolf, Greenfield & Sacks, P.C.

(57) ABSTRACT

A system comprising first and second fire-resistant parts for at least temporary fire-resistant sealing of an opening in a wall in which at least one transport device, such as a cable, conduit or tube, has been fed through or will be fed through. The first and second parts are each at least partly placeable in the opening. The first parts are designed to at least partly envelop the transport device and the second parts are designed to be placed between the first parts and/or between the first parts and an inner wall of the opening for the purpose of at least virtually completely sealing the opening. The first parts are substantially manufactured from a fire-resistant rubber. The second parts are manufactured from a fire-resistant material based on an elastomeric foam with a substantially closed cell structure. The foam includes at least one crust-forming, fire-retardant material.

9 Claims, 2 Drawing Sheets

(56) References Cited

U.S. PATENT DOCUMENTS

Figure 1:
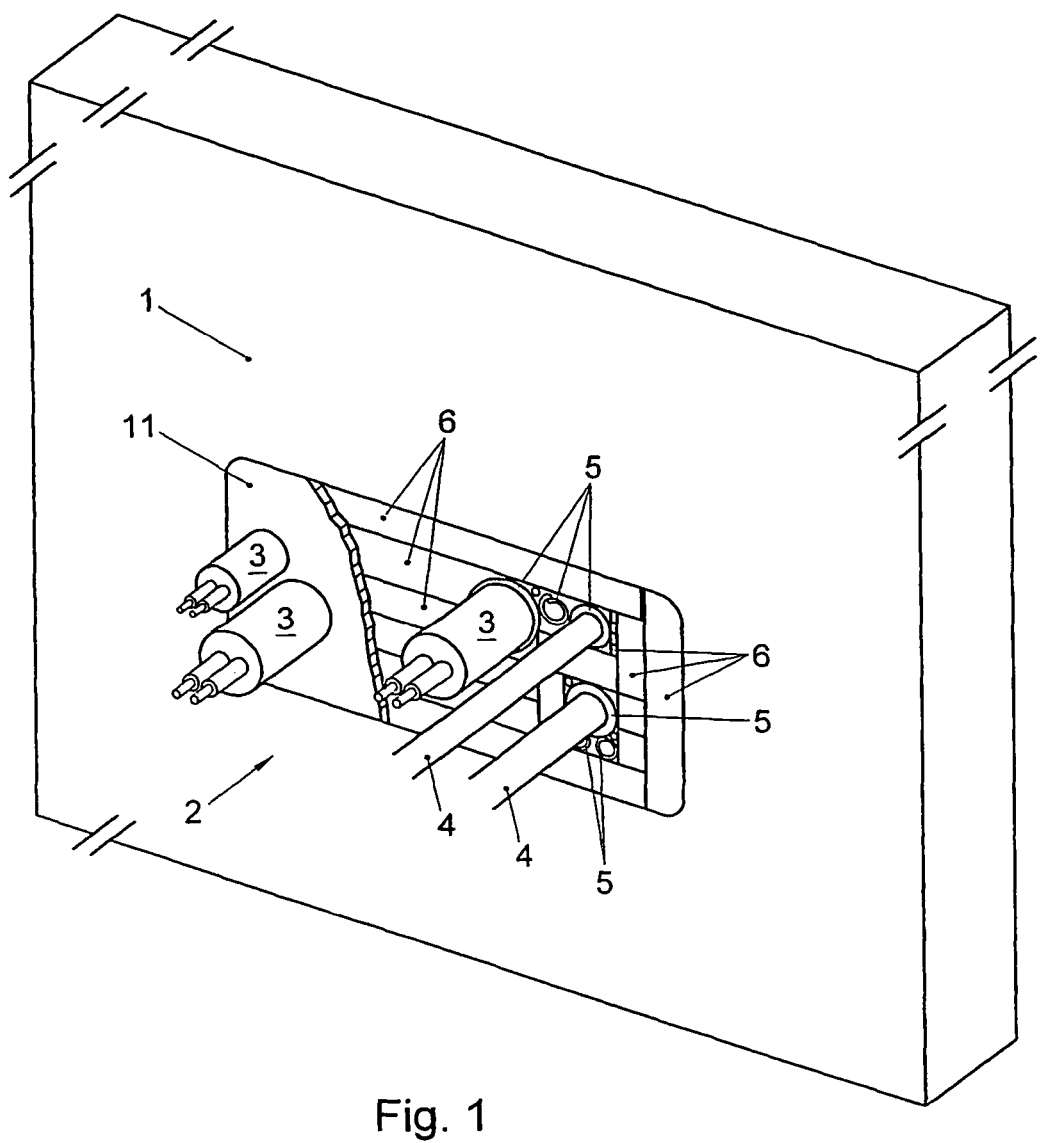

| | | | |
|---|---|---|---|
| 4,136,707 A | | 1/1979 | Gaillot et al. |
| 4,361,721 A | * | 11/1982 | Massey .................. 174/92 |
| 4,588,523 A | | 5/1986 | Tashlick et al. |
| 4,663,204 A | | 5/1987 | Langham |
| 4,740,527 A | | 4/1988 | Von Bonin |
| 5,067,676 A | * | 11/1991 | Beele ..................... 248/56 |
| 5,344,106 A | * | 9/1994 | Beele ..................... 248/56 |
| 5,650,448 A | | 7/1997 | Wallace et al. |
| 5,719,199 A | | 2/1998 | Wallace et al. |
| 5,739,173 A | | 4/1998 | Lutter et al. |
| 6,153,668 A | | 11/2000 | Gestner et al. |
| 6,153,674 A | | 11/2000 | Landin |
| 6,228,914 B1 | | 5/2001 | Ford et al. |
| 6,359,224 B1 | | 3/2002 | Beele |
| 6,484,463 B1 | * | 11/2002 | Fay ....................... 52/404.4 |
| 6,521,834 B1 | | 2/2003 | Dykhoff et al. |
| 6,536,169 B2 | | 3/2003 | Dykhoff |
| 6,706,793 B2 | | 3/2004 | Abu-Isa et al. |
| 6,732,481 B2 | | 5/2004 | Stahl |
| 6,809,129 B2 | | 10/2004 | Abu-Isa |
| 6,820,382 B1 | | 11/2004 | Chambers et al. |
| 6,901,711 B2 | | 6/2005 | Fay et al. |
| 6,928,777 B2 | | 8/2005 | Cordts |
| 7,087,670 B2 | | 8/2006 | Hoch et al. |
| 7,114,303 B2 | | 10/2006 | Cordts et al. |
| 2002/0020827 A1 | * | 2/2002 | Munzenberger et al. ......... 252/3 |
| 2002/0178664 A1 | | 12/2002 | Dykhoff |
| 2003/0125447 A1 | | 7/2003 | Hoch et al. |
| 2004/0093814 A1 | * | 5/2004 | Cordts et al. .............. 52/220.8 |
| 2004/0093815 A1 | | 5/2004 | Cordts |
| 2004/0231880 A1 | | 11/2004 | Beele |
| 2005/0179214 A1 | | 8/2005 | Beele |
| 2006/0053710 A1 | | 3/2006 | Miller et al. |

FOREIGN PATENT DOCUMENTS

| | | | | |
|---|---|---|---|---|
| DE | 4234374 A1 | | 4/1994 | |
| EP | 0217080 A1 | | 8/1986 | |
| EP | 0524563 A1 | | 1/1993 | |
| EP | 1739120 A1 | | 6/2006 | |
| FR | 2553084 A | | 4/1985 | |
| GB | 1500912 A | | 2/1978 | |
| GB | 2226033 A | * | 6/1990 | ............... C08K 3/00 |
| JP | 2000-170282 | | 6/2000 | |
| JP | 2001-270998 | | 2/2001 | |
| JP | 2002-506185 | | 2/2002 | |
| JP | 2002-506186 | | 2/2002 | |
| NL | 1018722 | | 4/2003 | |
| WO | WO 93/22814 A | | 11/1993 | |
| WO | WO 03/013658 | | 2/2003 | |
| WO | WO 03/013658 A1 | | 2/2003 | |
| WO | WO 03/067136 | | 8/2003 | |
| WO | WO 2005/078884 A3 | | 8/2005 | |

OTHER PUBLICATIONS

PCT International Search Report from International Application No. PCT/NL2005/000099 dated Oct. 21, 2005.

Office Action from European Application No. EP20040730133.8 dated Aug. 27, 2009.

Office Action from U.S. Appl. No. 10/553,428 dated Jul. 20, 2010.

\* cited by examiner

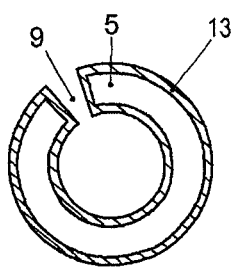
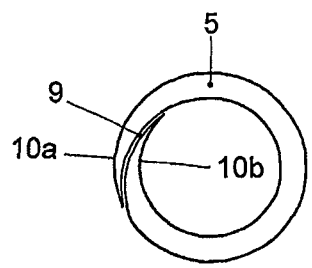
Fig. 2a        Fig. 2b
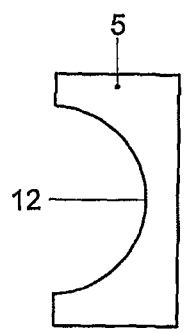
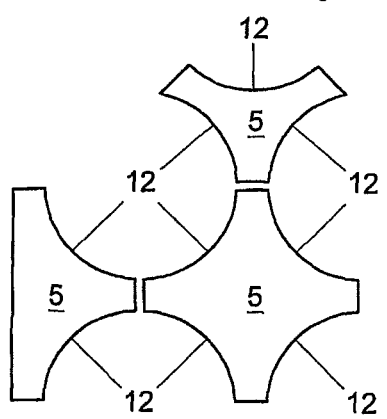
Fig. 2c        Fig. 2f        Fig. 2e
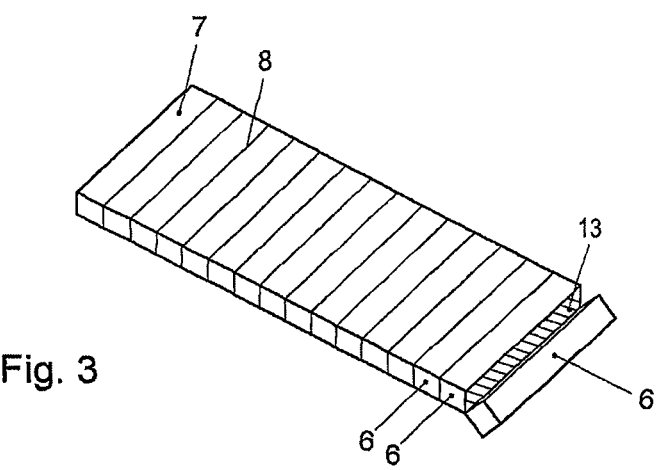
Fig. 3

SYSTEM AND METHOD FOR SEALING AN OPENING IN A WALL IN WHICH AT LEAST ONE TRANSPORT DEVICE SUCH AS A CABLE, CONDUIT OR TUBE HAS BEEN FED THROUGH

The invention relates to a system comprising first and second fire-resistant parts for at least temporary fire-resistant sealing of an opening in a wall in which at least one transport device such as a cable, conduit or tube has been fed through, or will be fed through, where the first and second parts are each at least partly placeable in the opening, where the first parts are designed to at least partly envelop the transport device and where the second parts are designed to be placed between the first parts and/or between the first parts and an inner wall of the opening, where the first parts are manufactured substantially from a fire-resistant rubber and/or fire-resistant thermoplastic.

The invention further relates to a wall with an opening extending through that wall in which at least one transport device such as a cable, conduit or tube has been fed through. Through such a device, matter and/or energy is passed on during use. Therefore, instead of transport device, the term "passing device" could be used or simply the term "conduit", where conduit is also understood to mean a cable or a tube.

The invention further relates to a wall with a sealed feed-through.

The invention further relates to a method for sealing an opening extending through a wall in which at least one transport device such as a cable, conduit or tube has been fed through.

Finally, the invention relates to a method for feeding a transport device such as a cable, conduit or tube through a sealed opening extending through a wall.

In this context, a wall is understood to mean any partitioning between two spaces. Accordingly, in this document, a partition, floor, deck or ceiling is also covered by the term wall.

Such a system is often used for sealing an opening in a wall to prevent a fire taking place in a space located on one side of the wall from spreading to another side of the respective wall.

A system as described hereinabove is known from EP 0 534 563. In the known system, the first and second fire-resistant parts each comprise parts manufactured from a similar rubber. The first and second parts are also often designed so as to be identical in shape. In use, each transport device extending through the opening in the wall is enveloped by the fire-resistant rubber parts. For this purpose, the fire-resistant parts often have a hose-shaped design. The remaining free space in the opening is also filled with rubber fire-resistant parts. Although such a sealing is sufficient in many cases, it has been found that, in some cases, a better sealing is desired.

An object of the invention is to provide an alternative and preferably even an improved system for at least temporary fire-resistant sealing of an opening in the wall in which at least one transport device such as a cable, conduit or tube has been fed through or will be fed through. This object is achieved with a system according to the invention characterized in that the second parts are manufactured from a fire-resistant material based on an elastomeric foam with a substantially closed cell structure, in which foam at least one crust-forming, fire-retardant material is included. The second parts are manufactured from a foam material that is more compressible than the rubber first parts. This ensures that a suitable sealing can be obtained in a simple and relatively quick manner. This would be much more laborious if only rubber first parts were used, especially when the opening requires relatively much sealing after feeding through of the transport device. This is because the compressible parts, the second parts, can be placed in the remaining free openings in the sealing in a slightly compressed condition. Upon rebounding, these second parts will press the other parts included in the opening, which improves the jamming in the feed-through in relation to the first parts.

An additional advantage is that the air/gases trapped in the closed cell structure of the second parts, hereinafter often to be called the foam parts, bring about a more gradual expansion upon exposure to heat than the air trapped in the rubber first parts. This disproportional expansion of the feed-through prevents the creation of an extremely high pressure in the feed-through. An extremely high pressure is undesired. The reason for this is that a cement layer possibly applied on an outside of the feed-through could come off. Such a cement layer will be described hereinbelow.

Another additional advantage of the second parts is that these parts insulate extremely well, particularly compared with the rubber first parts. This will also prevent the trapped air from expanding to an unacceptable extent.

Further, the foam structure is long preserved upon exposure to fire. In view of the fact that the second parts, the foam parts, have a good insulating action compared with the rubber first parts and the foam parts are light compared with the first rubber parts, the feed-through can have a weight-saving design, and, in particular, a relatively short length is sufficient in the direction of the feed-through direction. This is particularly important in shipbuilding and offshore.

As already indicated hereinabove and as will be discussed in more detail hereinbelow, a sealing cement layer can be applied on the outside. The second foam parts have a good bonding surface for this cement. Especially when the rubber first parts have a hose-shaped design, it is advantageous that the remaining opening can be sealed with the foam parts instead of with the hose-shaped rubber first parts. Although the bonding surface is increased, still, less sealing cement needs to be used compared with a situation in which the system exclusively comprises rubber first parts. This is because, in the latter situation, the sealing cement can end up in and between the empty hose-shaped first parts. In other words, the system according to the invention saves sealing cement.

Incidentally, the elastomeric foam expands away from the fire. As a result, the material remains available longer for the required action. This effect will be returned to hereinbelow.

The foam can, in fact, be manufactured from any polymeric material which is suitable for the formation of closed cells. It is preferably halogen-free and fire-retardant. More in detail, it can be manufactured from unsaturated polymers such as natural rubber, styrene butadiene rubber, and nitrile butadiene rubber; but also from saturated polymers such as EPDM rubber and preferably from ethylene vinyl acetate (EVA). In order to form a foam from these polymers, the polymers need to be crosslinked, where the unsaturated polymers can suitably be crosslinked with, for instance, sulfur and sulfur donors, while the saturated polymers can suitably be crosslinked with, for instance, peroxides. From these polymer materials, a foam structure with a substantially closed cell structure can be obtained by adding chemical blowing agents and having them expand, particularly blowing agents of the nitrogen type such as azodicarbon and hydrazine. In this specification and the following claims, a "substantially closed cell structure" is understood to mean a cell structure in which at least 60%, but more preferably at least 75% of the cells is closed. On the basis of EVA, material can be obtained which comprises more than 80% of closed cells.

In the foam, at least one crust-forming fire-retardant material needs to be included. For this, borates conventionally used as fire retardants; softeners of the organic phosphate type such as trialkyl and triaryl phosphates, and particularly trioctyl phosphate, triphenyl phosphate and diphenyl cresyl phosphate; solid fire retardants such as ammonium polyphosphate, for instance Antiblaze MC®; and melamine polyphosphate (melapur 200) can very suitably be used. In a preferred embodiment, the crust-forming, fire-retardant agent is ammonium polyphosphate or melamine phosphate. Most preferably, melamine phosphate is used. These crust-formers need to be present in such a high amount that they form a fire-retardant crust. Although a skilled person knows these amounts and is certainly capable of determining these amounts, as a guideline, an amount of this agent is recommended in the range of 2-20 wt. % based on the weight of the foam. Preferably, 3-10 wt. % of crust-former is used, most preferably 4-8 wt. %.

In particular, it holds true that a pH-neutralized graphite material is included in the foam. Optionally, it holds true that the graphite material expands at a temperature higher than 200° C.

As a rule, expanding graphite is obtained by intercalation of graphite, where (most often) nitrogen or sulfur compounds slide between the graphite lattices; it is, for instance, commercially available as "Blähgraphit" from GK Kropfmühl, Hauzenberg, Germany. This material is prepared by treating graphite with, for instance, sulfuric acid or nitric acid. A pH neutralization of intercalated graphite ensures that the foam formation, and possibly also the foam material itself, is not adversely effect by any acid residues, while, in addition, no corrosion problems occur in any possible material sensitive to corrosion which contacts the foam. The pH neutralization may, for instance, be carried out by very thorough washing or by adding a sufficient amount of base material. Such a graphite is available under the name of carbofoil from Cleanline products.

As a rule, the graphite material is used in an amount between 5 and 20 wt. % based on the weight of the foam, more preferably in an amount between 8 and 15 wt. % and most preferably between 10 and 12 wt. %.

In addition to the essential fire-retardant or fire-resistant components, other fire retardants may be present as well. It is greatly preferred that these are also halogen-free. For instance, aluminum trihydrate, for instance Apyral 2E® or HN336 from Huber can be present in large amounts, up to 60 wt. %, but preferably in an amount between 25 and 50 wt. %, as long as the ratio of polymer material to these other fire retardants does not exceed 1:2.

In a preferred composition, the foam consists of crosslinked EVA polymer, 20-40 wt. % aluminum hydroxide, 5-20 wt. % pH-neutralized graphite, 2-20 wt. % ammonium polyphosphate or melamine polyphosphate and up to 10 wt. % softener, dispersant, lubricant, colorant, antioxidants, crosslinkers and other conventional auxiliary substances.

Incidentally, all additives in the foam need to initially present in a form and be of such a nature that they are compatible with the closed cell structure of the foam. In other words: the additives must neither act aggressively on the polymer matrix nor be initially present in a form which disturbs the structure of the foam, for instance in the form of too large particles.

Without wishing to be bound to any theory, it is assumed that the foam according to the invention derives its action from, on the one hand, a chemical reaction leading to the formation of a crust on the fire side and, on the other hand, from both an expansion of gas trapped in the closed-cell structure under the influence of the heat development associated with the fire and possible expansion of the graphite. The expansion provides a heat insulation behind the crust formation. The foam material provides a material moving away from the fire side over time which also functions as a heat-insulating layer. By substantially not expanding to the fire side, the fire-retardant foam according to the invention remains intact and therefore effective for a longer time.

In the foam, the expansion is hardly or not accompanied by the formation of a large amount of smoke gases. The action of the foam is not based on smoke development either. The smoke number of the foam is low while, as a rule, gases possibly formed are considerably less toxic than, for instance, the gases released with foams with an intumescent action, such as foam based on polyurethanes.

Due to the substantially closed cell structure, the foam substantially absorbs no water. It is therefore not necessary to apply a layer sealing from the environment on the foam.

The foam can be manufactured from polymer material having a much higher self-combustion than the spongelike polyurethane materials conventionally used. Further, the foam according to the invention has a much greater mechanical strength, so that it can well be processed into construction elements. For instance, the material can well be designed in the form of plates with notches, which notches enable the breaking or tearing off of strips. This is of course favorable to the filling of feed-throughs in a wall, or at least makes the process easier.

In addition, the closed cell structure provides a better mechanical memory effect, so that, due to compression of the foam parts, pressure built up inside the feed-through is preserved much longer than when a foam with open pore structure is used.

Although not essential, after placement in the feed-through, the foam can be finished with a layer of optionally fire-resistant cement in order to obtain a completely gas and watertight fire-resistant feed-through.

Preferably, at least one of the second parts is designed in the form of a plate-shaped or beam-shaped element. A designing step during the manufacture of such parts may, for instance, comprise a heat-pressing or injection-molding step. These elements can often simply be placed in the opening. It is possible that at least one of the two parts is part of a plate-shaped material from which, by means of a weakening line included in the plate-shaped material, at least one of the second parts can be detached. This is a convenient manner for transporting and delivering the second parts, and making them suitable for placement in the opening.

For at least one of the first parts, it preferably holds true that it is sleeve-shaped and comprises a slot for the purpose of being able to place it on the transport device. In that case, a first part can very simply be provided around the transport device.

In addition, it may hold true that one of the first parts can brought into a condition where the longitudinal edges of the slot permanently overlap each other under the influence of material stress. It follows from this that the connection of the first parts to the transport device is favorable. For the latter embodiments, it moreover holds true that the first parts can be provided around the transport device before, but also after the transport device is placed in the opening.

It is also possible that at least two, three or four of these first parts are designed such that these first parts can together form a sleeve placeable around the transport device. This has the advantage that it is especially very simple to envelop the transport device in cases in which a sleeve-shaped first part provided with a slot is not simply placeable around the transport device, for instance when cables have expanded such that the space between the cables does not allow provision of a sleeve-shaped first part.

Preferably, the system is further provided with a lubricant which can be applied to a surface of each of the first and/or second parts. This makes it easier to be able to place particularly the parts which are the last to be included in the opening between the already placed parts for completing the sealing. This is because possible high frictional forces can be prevented by the lubricant.

The invention is further elucidated with reference to a drawing, in which:

FIG. 1 shows a wall with an opening provided with a system according to an embodiment of the invention;

FIG. 2a diagrammatically shows a cross section of a first embodiment of a first part of the system according to the invention;

FIG. 2b diagrammatically shows a cross section of a second embodiment of a first part of the system according to the invention;

FIG. 2c diagrammatically shows a cross section of a third embodiment of a different part of a first part of the system according to the invention;

FIG. 2d diagrammatically shows a cross section of a fourth embodiment of a first part of the system according to the invention;

FIG. 2e diagrammatically shows a cross section of a fifth embodiment of a first part of the system according to the invention;

FIG. 2f diagrammatically shows a cross section of a sixth embodiment of a first part of the system according to the invention; and FIG. 3 shows an embodiment of a second part of a system according to the invention.

FIG. 1 shows an example of a wall 1 and an opening 2 in which, in this case, a plurality of transport devices, in this case comprising cables 3 and tubes 4, is fed through. Instead of a cable or tube, a conduit may also have been fed through the opening. The opening has been sealed with first fire-resistant parts 5 and second fire-resistant parts 6. The first and second parts are wholly or partly placed in the opening. The first parts 5 are each designed to at least partly envelop at least one of the transport devices. The second parts are designed to be placed between the first parts and/or between the first parts ands an inner wall of the opening 2 for the purpose of at least virtually completely sealing the opening 2. Designed for this purpose is understood to mean that the dimensions and shape are suitable. The first parts are each substantially manufactured from a fire-resistant rubber. Examples of such first parts are described in NL 1018722 and EP 0 534 563 B1. Such rubber parts may also be provided with expandable graphite and a polyphosphate as a fire-retardant agent.

The second parts 6 are each manufactured from a fire-resistant material based on an elastomeric foam with a substantially closed cell structure. In the foam, at least one crust-forming, fire-retardant material is included. Preferably, a pH-neutralized material is included in the foam as well. The graphite material preferably expands at a temperature higher than 200° C. The crust-forming, fire-retardant material may be chosen from a polyammonium phosphate and melamine phosphate. The second parts 6 preferably have a plate-shaped or beam-shaped design. It is possible that at least one of the second parts 6 is part of a plate-shaped material from which, by means of breaking along a weakening line 8 included in the plate-shaped material 7 (see FIG. 3), at least one of the second parts 6 can be detached. Preferably, it holds true that one of the first parts has a sleeve-shaped design (see FIG. 2a) and comprises a slot 9 for the purpose of placing it around one of the cables or tubes. It may also hold true that one of the first parts 5 can be brought into a condition in which longitudinal edges 10a, 10b of the slot 9 permanently overlap each other under the influence of material stress, as shown in FIG. 2b by way of example.

It is also possible that at least two, three or four of the first parts are designed such that the first parts can together form a sleeve placeable around the transport device. FIGS. 2c-2f give examples of such first parts. It will be clear that, in use, the curved parts 12 are preferably provided against a cylinder casing of a cable, conduit or tube. It is noted that the system may further be provided with a lubricant 13 (shown schematically in FIGS. 2a and 3 for illustrative purposes) which can be applied to surfaces of each of the first and/or second parts before these parts are provided in the opening. This facilitates the placing of the parts, particularly when completion of the sealing is near. Though FIG. 1 shows a wall with an opening extending through that wall in which at least one transport device such as a cable or tube has been fed through, it is also possible that the system is used with a wall which is only provided with a feed-through, i.e. an opening, which needs to be sealed at least temporarily and in which a cable, conduit or tube has not or not yet been fed through.

The system can be used as follows for sealing an opening extending through a wall in which at least one transport device such as a cable or tube has been fed through. In this case, one or more first parts designed to at least partly envelop a transport device and are manufactured from a fire-resistant rubber are to be placed at least partly around the transport device. One or more first parts which are designed to at least partly envelop a transport device and are manufactured from a fire-resistant rubber are also to be placed in the opening of the wall. Then, the second parts are to be placed between the first parts and an inner wall of the opening. These second parts are designed to at least virtually completely seal the opening and are manufactured from a fire-resistant material based on an elastomeric foam with a substantially closed cell structure. In this foam, at least one crust-forming, fire-resistant material is included. Incidentally, it preferably holds true that the foam comprises a pH-neutralized graphite agent.

It is, in principle, possible that the first parts first envelop the transport device and that the transport device is then placed in the opening. However, it can also be the other way around. In that case, the transport device is first fed through the opening and the first parts are then provided around the transport device in the opening.

Feeding a transport device such as a cable, conduit or tube through an opening extending through a wall which has been sealed with foam parts manufactured from a fire-resistant material based on an elastomeric foam with a substantially closed cell structure, where at least one crust-forming, fire-retardant material is included in the foam, proceeds as follows. Here, it preferably holds true as well that a pH-neutralized graphite material is included in the foam. The starting point is that the opening is sealed by the foam parts. Then, at least one of the foam parts is taken from the sealing. Around the transport device, one or more fire-resistant rubber parts is/are at least partly provided. These fire-resistant rubber parts are designed to at least partly envelop the transport device in the sense that the fire-resistant rubber parts are, for instance, shaped such that they effect a good connection with the transport device, comprising a cable, conduit or tube. The transport device is fed through the opening and one or more of the fire-resistant rubber parts are thereby, or separately thereafter, placed in the opening. Here, it preferably holds true as well that a pH-neutralized graphite material is included in the foam.

The first parts do not need to be used exclusively for envelopment of a transport device. It is also possible to fill part of the remaining space in the opening with first parts.

The ratio of the amounts of first and second parts, expressed in numbers or in volume units, can be determined by any skilled person himself. The shape of the opening, the required quality of the sealing and the like also determine which ratio is optimal for a situation.

As shown in FIG. 1, the system may also comprise a heat-resistant and/or water-repellant sealing cement 11.

This cement 11 is chosen such that is has good bonding properties and will cure to a rubberlike material within 24 hours at an average air humidity. Preferably, the cement 11 is expandable under the influence of fire. The heat-resistant and/or water-repellant cement 11 guarantees a watertight and gastight feed-through of the electrical cables 3. It is noted that the sealing cement 11 is partly left out in FIG. 1 to not unnecessarily complicate FIG. 1. The cement often comprises an oxime-curing cement. Oil can be included for achieving a desired viscosity. As a filler, chalk is often used. Further, the cement also preferably comprises expandable graphite and a polyphosphate as a fire-retardant agent.

It is further noted that a wall can also be understood to mean a partition in a ship, on an offshore platform or in a building construction. In addition, in the context of this document, a floor and a ceiling are also considered a wall.

It is further noted that the shape of each of the first parts is, in principle, freely determinable. When, instead of a round transport device, for instance a transport device with right angles is fed through the opening in the wall, then the first parts can also comprise right angles. These foam parts may also have a sleeve-shaped design, or manufacturing, for instance, be designed such that connection to a cylinder-shaped first part is possible while an outside has an angular, in particular beam-shaped profile. These parts can also be designed in one piece with a longitudinal slot or be assembled on the basis of multiple longitudinal parts.

It likewise holds true for the second parts that the shape thereof is, in principle, freely determinable. It is also possible that, for instance when used in a round opening, the second parts are also provided with curves connected thereto. It is also possible that a rubber first part comprises a sleeve which is designed such that an inside of the sleeve connects to a cylinder casing of a cable, conduit or tube, while such an outside has an angular, in particular beam-shaped design. Such a variant can be provided with a slot in the longitudinal direction or can be assembled by combination of multiple longitudinal parts.

Such variants are each considered to be within the framework of the invention.

The invention claimed is:

1. A system comprising first and second fire-resistant parts for at least temporary fire-resistant sealing of an opening in a wall in which at least one transport device has been fed through, or will be fed through, each of the first and second parts being at least partly placeable in the opening, the first parts being designed to at least partly envelop the transport device and the second parts being designed to be placed in direct contact with and between the first parts and/or in direct contact with and between the first parts and an inner wall of the opening to at least virtually completely seal the opening, the first parts being substantially manufactured from a fire-resistant rubber and/or a fire-resistant thermoplastic, or a combination thereof, the second parts being manufactured from a fire-resistant material based on an elastomeric foam with a substantially closed cell structure, the foam including at least one crust-forming, fire-retardant material, wherein the crust-forming fire-retardant material has been chosen from polyammonium phosphate or melamine phosphate, and wherein the crust-forming fire-retardant material is present in such an amount that a fire retardant crust is formed on a side of the foam when exposed to a fire.

2. The system according to claim 1, wherein the foam includes a pH-neutralized graphite material.

3. The system according to claim 2, wherein the graphite material expands at a temperature higher than 200° C.

4. The system according to claim 1, wherein at least one of the second parts is designed in the shape of a plate-shaped element or a beam-shaped element.

5. The system according to claim 1, wherein at least one of the second parts is part of a plate-shaped material that includes a weakening line along which at least one of the second parts can be detached.

6. The system according to claim 1, wherein at least one of the first parts is sleeve-shaped and includes a slot to allow the at least one of the first parts to be placed around the transport device.

7. The system according to claim 6, wherein the at least one of the first parts is constructed and arranged to allow longitudinal edges of the slot to permanently overlap each other under the influence of material stress.

8. The system according to claim 1, wherein at least two of the first parts are designed such that the at least two of the first parts can together form a sleeve that is placeable around the transport device.

9. The system according to claim 1, further comprising a lubricant which can be applied to a surface of each of the first and/or second parts.

* * * * *